(12) United States Patent
Khan et al.

(10) Patent No.: US 10,938,714 B2
(45) Date of Patent: Mar. 2, 2021

(54) COMMUNICATION BETWEEN DISTINCT NETWORK DOMAINS

(71) Applicant: Cisco Technology, Inc., San Jose, CA (US)

(72) Inventors: Atif Khan, San Jose, CA (US); Himanshu H. Shah, Milpitas, CA (US); Nehal Bhau, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 16/551,381

(22) Filed: Aug. 26, 2019

(65) Prior Publication Data

US 2019/0379601 A1    Dec. 12, 2019

Related U.S. Application Data

(63) Continuation of application No. 15/466,817, filed on Mar. 22, 2017, now Pat. No. 10,397,102.

(60) Provisional application No. 62/311,865, filed on Mar. 22, 2016.

(51) Int. Cl.
*H04L 12/24* (2006.01)
*H04L 12/723* (2013.01)
*H04L 12/745* (2013.01)
*H04L 12/715* (2013.01)

(52) U.S. Cl.
CPC .......... *H04L 45/507* (2013.01); *H04L 45/748* (2013.01); *H04L 45/04* (2013.01)

(58) Field of Classification Search
CPC ..... H04L 45/507; H04L 45/748; H04L 45/04; H04L 12/24; H04L 41/0654; H04Q 11/0066
See application file for complete search history.

(56) References Cited

U.S. PATENT DOCUMENTS

| | | | |
|---|---|---|---|
| 2005/0030951 A1 | 2/2005 | Maciocco et al. | |
| 2006/0262735 A1* | 11/2006 | Guichard | H04L 12/66 370/254 |
| 2013/0170435 A1 | 7/2013 | Dinan | |
| 2015/0009806 A1* | 1/2015 | Bashandy | H04L 45/28 370/221 |
| 2018/0331871 A1* | 11/2018 | Martinez | H04W 88/085 |

* cited by examiner

*Primary Examiner* — Wei Zhao
(74) *Attorney, Agent, or Firm* — Polsinelli PC (57) ABSTRACT

A system may include a first border network device located between a first network domain and a third network domain, and a first edge network device in the first network domain, where the first edge network device may be configured to receive a packet. The packet may be directed to a second edge network device in a second network domain. The first edge network device may also be configured to add a second label to the packet that identifies a second border network device located at the border of a second network domain and the third network domain. The third network domain may be located between the first network domain and the second network domain. The first edge network device may additionally be configured to add a first label to the packet that identifies the first border network device, and route the packet to the first border network device.

20 Claims, 7 Drawing Sheets

COMMUNICATION BETWEEN DISTINCT NETWORK DOMAINS

CROSS-REFERENCE TO RELATED APPLICATIONS

This application is a Continuation of, and claims priority to, U.S. Non-Provisional patent application Ser. No. 15/466,817, filed Mar. 22, 2017, which claims the benefit of U.S. Provisional Patent Application No. 62/311,865, filed Mar. 22, 2016, which are incorporated herein by reference in their entireties.

FIELD

The embodiments discussed in the present disclosure are related to communication between distinct network domains.

BACKGROUND

The use of networks is a useful tool in allowing communication between distinct computing devices. Despite the proliferation of computers and networks over which computers communicate, there still remain various limitations to current network technologies.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

One or more embodiments of the present disclosure may include a method that includes, at a first edge network device in a first internal network domain, receiving a packet from a first computing device, where the first packet may be directed to a second computer associated with a second edge network device in a second internal network domain. The method may also include, at the first edge network device, adding a second label to the packet, where the second label identifies a second border network device located at the border of a second internal network domain and a third network domain located between the first internal network domain and the second internal network domain. The method may additionally include, at the first edge network device, adding a first label to the packet, where the first label identifies a first border network device located at the border of the first internal network domain and the third network domain. The method may also include routing the packet to the first border network device.

One or more embodiments of the present disclosure may include a network device in a first internal network domain, where the network device may include one or more processors, one or more communication devices, and one or more non-transitory computer readable media containing instructions that, when executed by the one or more processors, performs operations. The operations may include receive a packet from a first computing device via the one or more communication devices, where the first packet may be directed to a second computer associated with a second edge network device in a second internal network domain. The operations may additionally include add a second label to the packet that identifies a second border network device located at the border of a second internal network domain and a third network domain located between the first internal network domain and the second internal network domain. The operations may additionally include add a first label to the packet that identifies a first border network device located at the border of the first internal network domain and the third network domain, and route the packet to the first border network device via the one or more communication devices.

One or more embodiments of the present disclosure may include a system that includes a first border network device located at a border between a first internal network domain and a third network domain. The system may also include a first edge network device in the first internal network domain, where the first edge network device may be configured to receive a packet from a first computing device. The packet may be directed to a second computer associated with a second edge network device in a second internal network domain. The first edge network device may also be configured to add a second label to the packet, where the second label identifies a second border network device located at the border of a second internal network domain and the third network domain, and the third network domain may be located between the first internal network domain and the second internal network domain. The first edge network device may additionally be configured to add a first label to the packet that identifies the first border network device, and route the packet to the first border network device.

The object and advantages of the embodiments will be realized and achieved at least by the elements, features, and combinations particularly pointed out in the claims.

It is to be understood that both the foregoing general description and the following detailed description are merely examples and explanatory and are not restrictive of the claims.

BRIEF DESCRIPTION OF THE DRAWINGS

Example embodiments will be described and explained with additional specificity and detail through the use of the accompanying drawings in which.

DESCRIPTION OF EMBODIMENTS

Broadly, embodiments of the present disclosure include techniques and apparatus to implement, in overlay networks, a hierarchical data plane, organized into multiple discrete network domains (which may be referred to as groups or regions). Border network devices may be located at the borders of the network domains and configured to route traffic between the network domains. Advantageously, the border network devices may or may not be provisioned with route information for all of the different discrete network domains, as will be explained in greater detail below. Also, edge network devices discover the border network device associated with their network domain/group dynamically and create an overlay data path to them. Border network devices may discover other border network devices and create overlay data paths to the other border network devices. Hence, an overlay data path between a source edge network device and a destination edge network device in different network domains may include a first path segment to the source border network device in the source network domain, a second path segment between the source border network device and the destination border network device, and a third path segment through the destination network domain to the destination edge network device. Additionally, such a path may be dynamically created. In some embodiments, the border network devices may utilize labels added to packets to identify which path segment and/or which border network device is to be used in routing the packet.

Advantageously, the hierarchical data plane may be established without the application of policy rules. Other advantages of the techniques/systems disclosed herein, may include end to end dynamic path selection based on end to end Service Level Agreement (SLA) metrics. For example, a given path or path segment may be selected by a source edge network device for routing of a packet based on the performance of the given path or path segment as compared to an SLA. Another advantage may include awareness of up/down state of any of the path segments in a given path and rerouting of traffic to a path with all segments in an up state. An additional advantage may include service insertion where certain traffic can be routed through a service (such as an L4-L7 service). For example, if a desired service is performed at a certain network device, the source edge network device may select a path that includes the certain network device. An additional advantage may include the inclusion of IP Multicast features across multiple distinct network domains. For example, based on a label of a packet received by a border network device, the border network device may multicast the packet to multiple locations, such as multiple border network devices and/or multiple edge network devices.

The advantages described above may include features that improve the performance of a computer and/or a computer network. Such improvements may include increased network capability, greater bandwidth, and increased simplicity of connections while maintaining functionality, among others.

Figure 1:
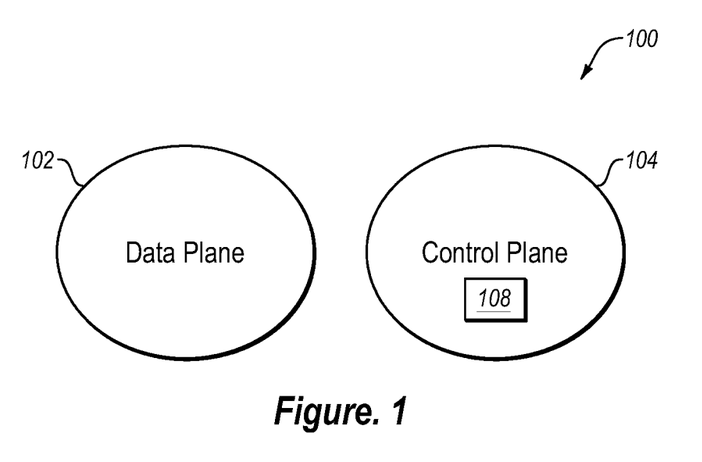
FIG. 1 illustrates an example software-defined network.

FIG. 1 illustrates an example software-defined network 100, in accordance with one or more embodiments of the present disclosure. For example, the network 100 may include a data plane 102, and a control plane 104. More specifically, the data plane 102 may be organized into multiple discrete network domains or groups. For example, one group may include edge network devices located at a company branch office located in one geographic region, whereas a second group may include edge network devices associated with a branch office of the company located in another geographic region. The network 100 may additionally include a control device 108 in the control plane to communicate with and/or control operation of the network devices communicating across the data plane 102, such as edge network devices and/or border network devices.

A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the present disclosure may be described in the context of an SD-WAN, such embodiments may also be implemented in any software-defined network.

In some embodiments, the control device 108 may be configured to manage the control plane of one or more network domains by directing one or more aspects of the operation of the network devices belonging to the network domains. For example, the control device 108 may generate and/or distribute policies to one or more of the network devices. A policy may include a rule or set of rules bearing on the handling of network traffic, such as routing, priority, media, etc. The one or more network domains may include an internal network domain that may operate as a secured and controlled domain with specific functionality and/or protocols. In some embodiments, the network devices within the network domains may operate based on one or more policies created and/or propagated by the control device 108.

Modifications, additions, or omissions may be made to the system 100 without departing from the scope of the present disclosure. For example, the system 100 may include more or fewer components than those illustrated in FIG. 1.

Figure 2:
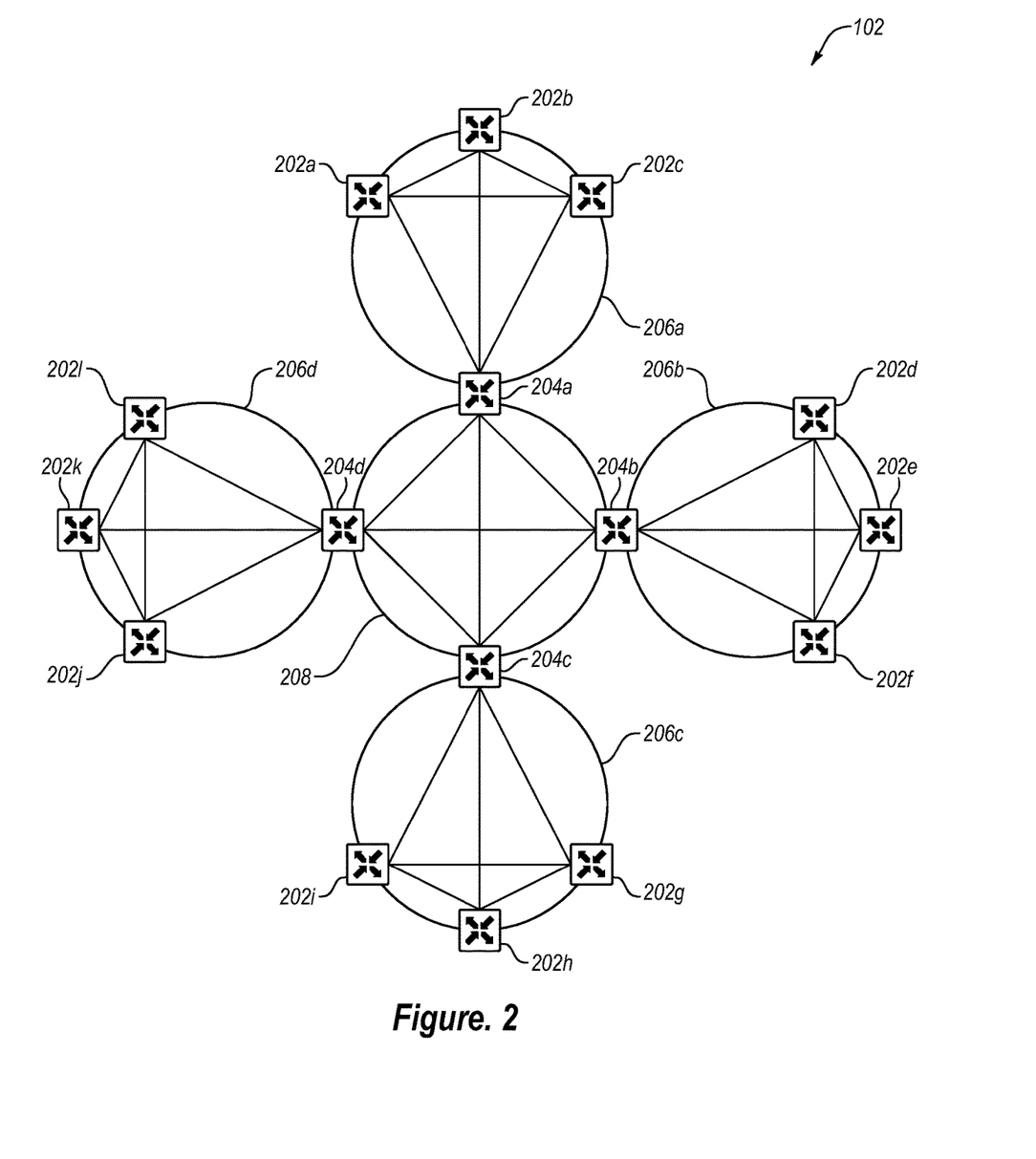
FIG. 2 illustrates an example data plane of the software-defined network of FIG. 1.

FIG. 2 illustrates an example data plane 102 of the software-defined network 100 of FIG. 1, in accordance with one or more embodiments of the present disclosure. The data plane 102 may be organized into five distinct network domains/groups, namely a first internal network domain 206a, a second internal network domain 206b, a third internal network domain 206c, and a fourth internal network domain 206d (collectively referred to as internal network domains 206). The data plane 102 may additionally include a network domain 208 that may include a special group configured to facilitate inter-network domain communications between the various other network domains. For example, the network domain 208 may be configured to facilitate inter-network-domain communication between the first network domain 206a and the third network domain 206c. The organization of the data plane 102 into various internal network domains 206 connected via the network domain 208 may be referred to as a hierarchical data plane.

In some embodiments, the network domain 208 may be regarded as a carrier network domain. For example, the network domain 208 may be under direct control of a third party carrier (such as AT&T or Verizon), and may include Internet connections, MPLS connections, cellular connections, fiber connections, or some other private network connections. In some embodiments, the internal network domains 206 may be regarded as a customer network domains. For example, the internal network domains 206 may be maintained and/or operated as different regions of offices or branches for a single entity. For example, a retailer may include all branches in the United States as the first internal network domain 206 and all branches in Europe as the second internal network domain 206b.

The number of network domains/groups shown in FIG. 2 is intended merely for illustrative purposes, and therefore the particular number of groups is non-limiting in any way. Each of the network domains 206 may include one or more edge network devices 202 (such as the edge network devices 202a-202c within the first internal network domain 206a, the edge network devices 202d-202f within the second internal network domain 206b, the edge network devices 202g-i within the third internal network domain 206c, and edge network devices 202j-1 within the fourth internal network domain 206d, all of which may be referred to collectively as edge network devices 202). In these and other embodiments, each edge network device 202 may be configured to control traffic to a defined set of prefixes, such as a network prefix according to IPv4 and/or IP v6.

In some embodiments, the edge network devices 202 within a particular internal network domain may be configured for full mesh communications with each other, for example, by means of the BFD protocol.

In some embodiments, one or more border network devices 204 may be located at the border of each of the internal network domains 206 and the network domain 208. Each border network device 204 may be configured to control the ingress and/or egress of traffic to and from its assigned internal network domain.

In one embodiment, the border network devices 204 have no knowledge of any network prefixes. For example, the border network devices 204 may or may not have stored information identifying which prefixes are associated with which edge network device 202. In these and other embodiments, a network prefix discovery process may be performed whereby the network prefixes across the different network domains are learned/acquired.

To facilitate the network prefix discovery process, in one embodiment the control plane 104 of FIG. 1 may be provisioned with at least one control device 108. In one embodiment, the control device 108 may be implemented as the controller described in U.S. patent application Ser. No. 14/133,558 (now U.S. Pat. No. 9,467,478), which application is incorporated herein by reference in its entirety. In some embodiments, a single control device may be configured for all network domains, including the internal network domains 206 and the network domain 208. In other embodiments, the internal network domains 206 and the network domain 208 may utilize different control devices. In some cases, all internal network domains 206 may be under control of a single control device.

In some embodiments, each edge network device 202 may maintain a persistent and secure communications channel with its assigned control device. In one embodiment, said secure communications channel may be implemented as a secure DTLS tunnel. Control information may be passed between an edge network device and an associated control device by means of a control plane protocol. In one embodiment, the control plane protocol may be the overlay management protocol (OMP), described in co-pending U.S. patent application Ser. No. 14/133,558.

The present disclosure includes multiple examples of situations in which such hierarchical data plane architecture may be used. A first example use case includes an embodiment in which an entity such as a business includes the edge network devices 202a-c of the first internal network domain 206a, where the edge network devices 202a-c connect to a public transport such as broadband Internet. Continuing the first use case example, the business may include the edge network devices 202d-f of the second internal network domain 206b, where the edge network devices 202d-f also connect to a public transport such as broadband Internet. Continuing the first use case example, a core network domain (e.g., the network domain 208) may exist where there are border network devices 204 serving each of the internal network domains 206. Additionally or alternatively, all border network devices 204 may connect to a common private network, such as a virtual private network (VPN) as well as the Internet. Further continuing the first use case example, each border network device 204 may establish an overlay data path to all other border network devices 204 over the private network. Continuing the first use case example and utilizing the architecture described, the edge network device 202a in the first internal network domain 206a may be able to establish a direct overlay path to the edge network device 202d in the second internal network domain 206b because both are connected to the Internet. However, the edge network device 202a may use the Internet only as a basis for connecting to the border network device 204a such that traffic between the edge network device 202a and the edge network device 202d may use the Internet only as a last mile transport. Stated another way, the Internet may only be used as the transport medium from the edge network device 202a to the border network device 204a, and/or from the border network device 204b to the edge network device 202d. Thus, the Internet is only used for the terminating path segments (e.g., the last mile), and the transport media of the network domain 208 may be used for the remaining path segment. Such an architecture may allow for the public transport (e.g., the Internet) to be used as a last mile transport only and inter-network domain connectivity may use a higher SLA transport, such as a private network of a carrier.

A second use case example may include embodiments where an entity may operate n number of edge network devices 202 with a requirement that each edge network device 202 does not build an overlay path to each of the other edge network devices in order to avoid (n−1) number of overlay paths from each edge network device 202. To prevent such an abundance of overlay paths while maintaining connectivity, the number of direct overlay paths may be limited to within an internal network domain/group. Inter-network domain connectivity may be over a path that includes, for example, an overlay from a source edge network device (the edge network device 202a) to the source border network device (the border network device 204a) to a destination border network device (the border network device 204b) and to the destination edge network device (the edge network device 202d).

In some embodiments, the internal network domains 206 may utilize a public transport such as the Internet for the medium of transportation and the network domain 208 may utilize a more-secure transportation medium.

Modifications, additions, or omissions may be made to the data plane 102 without departing from the scope of the present disclosure. For example, the data plane 102 may include any number of edge network devices 202, any number of border network devices 204, and/or any number of internal network domains 206.

Figure 3:
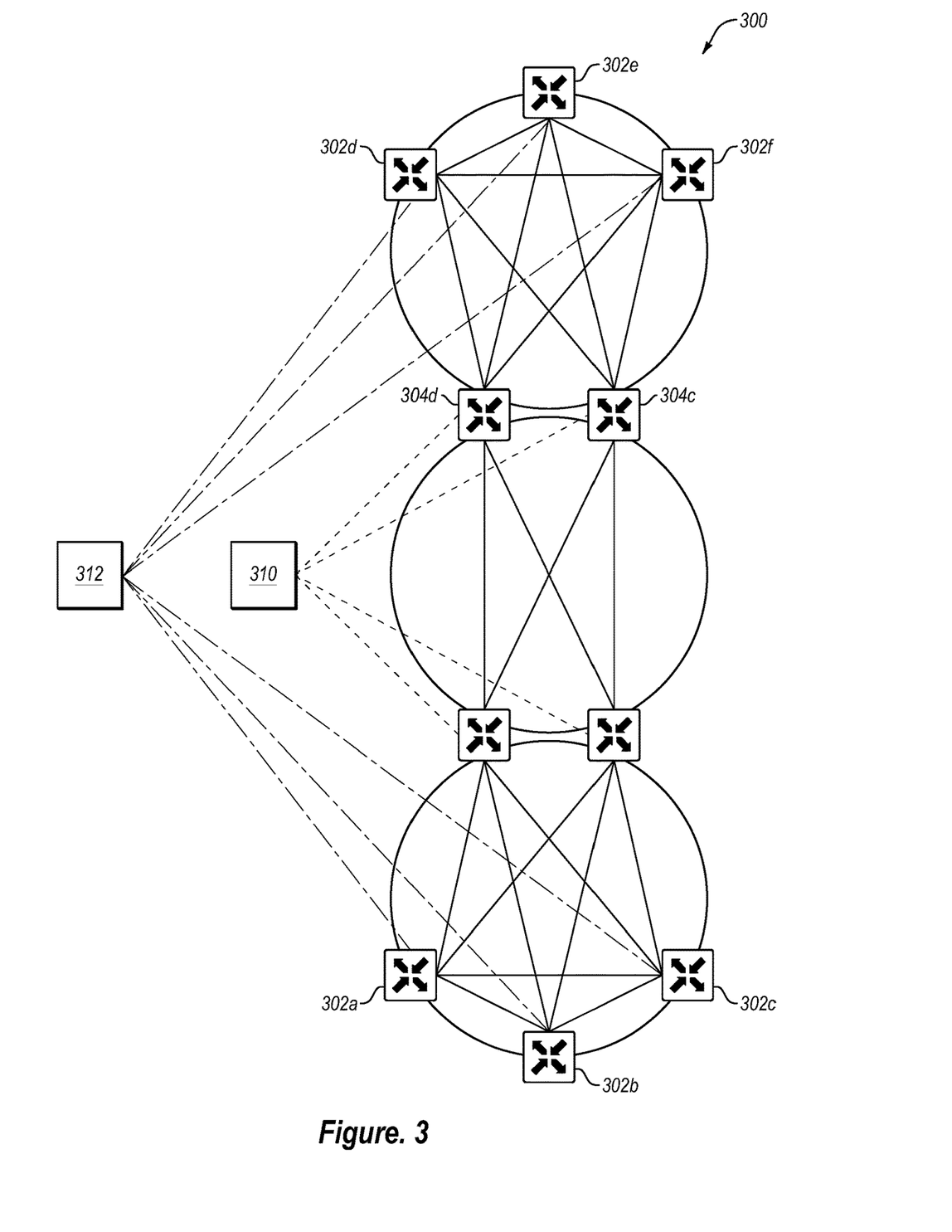
FIG. 3 illustrates another example software-defined network.

FIG. 3 illustrates another example software-defined network 300, in accordance with one or more embodiments of the present disclosure. The network 300 may include a first group of edge network devices 302a-c in a first internal network domain 306a with border network devices 304a and 304b at the border of the first internal network domain 306a and a third network domain 308. The network 300 may also include a second group of edge network devices 302d-302f in a second internal network domain 306b with border network devices 304c and 304d at the border of the second internal network domain and the third network domain 308. The network 300 may include a first control device 310 in communication with the border network devices 304 and a second control device 312 in communication with the edge network devices 302.

In one embodiment, the border network devices 304 may represent points of connectivity to a transport network (not shown) that may be implemented as a wide area network (WAN), such as the public Internet.

In some embodiments, each edge network devices 302 may be configured to establish a secure communications channel with the second control device 312, and each border network device 304 may be configured to establish a secure communications channel with the control device 310. In one embodiment, the establishment of the secure communications channels with the control devices may be executed as part of a bring up procedure such as the bring up procedure described in U.S. patent application Ser. No. 14/028,518, which is incorporated herein by reference in its entirety.

In one embodiment, each of the edge network devices 302, and/or the border network devices may include an identifier such as a transport locator (TLOC) which is reachable via routing in the transport network. A TLOC may be directly reachable via an entry in the routing table of the transport network or be represented by a prefix residing on the outside of a Network Address Translation (NAT) device, also present in the aforementioned routing table. A TLOC may act as the next-hop for overlay routes.

In some embodiments, a network prefix discovery process may be described with reference to the example architecture of the system 300. For example, the edge network device 302a may be associated with a network prefix indicated as P1 for ease of reference, whereas the edge network device 302d may be associated with a network prefix indicated as P2 for ease of reference. In some embodiments, the border network devices 304 may not have any prefixes associated with them. In one embodiment, each of the edge network devices 302 in the internal network domains 306 may be assigned a TLOC. For ease of reference, TLOC[VE1] is used herein to indicate the transport locator for the edge network device 302a, whereas TLOC[VE2] is the transport locator for the edge network device 302d. In one embodiment, each border network device 304 may be assigned a transport locator. Each network domain may be identified by a unique group ID assigned to it. An example, of such assignments may be shown in Table 1 below.

| Network Domain | Network Device | TLOC | Group-ID | Prefix |
| --- | --- | --- | --- | --- |
| 306a | Edge 302a | TLOC[VE1] | group-ID 1 | P1 |
| 306b | Edge 302d | TLOC[VE2] | group-ID 2 | P2 |
| 308 | Border 304a | TLOC[B1] | group-ID 0 | |

-continued

| Network Domain | Network Device | TLOC | Group-ID | Prefix |
| --- | --- | --- | --- | --- |
| 308 | Border 304b | TLOC[B1'] | group-ID 0 | |
| 308 | Border 304c | TLOC[B2] | group-ID 0 | |
| 308 | Border 304d | TLOC[B2'] | group-ID 0 | |

In one embodiment, after an edge network device 302 establishes the secure communications channel with its assigned control device 312, a message M1 may be sent from said the edge network device to the control device 312 using the secure communications channel. The message M1 may be in accordance with the control plane protocol. The message M1 may include the prefix associated with the edge network device 302, and the transport locator for the edge network device 302. For example, both the edge network device 302a and the edge network device 302b may originate messages M1 to the control device 312.

In one embodiment, each of the edge network devices 302 may originate a second message M2 to the control device 312. For example, the second messages M2 may include the transport locator of the originating edge network device 302 and a group-id of the group associated with the originating edge network device 302.

Similarly, each border network device 304 may be configured to originate messages M2 to the control device 310 to indicate the transport locator and group-ID associated with the border network device 304.

Examples of the content of various messages M1 and/or M2 are indicated in the Table 2 below.

| Message Type | Originator | Target | Content |
| --- | --- | --- | --- |
| M1 | Edge 302a | Control Device 312 | P1/TLOC[VE1] |
| M2 | Edge 302a | Control Device 312 | TLOC[VE1]/group-ID 1 |
| M2 | Border 304a | Control Device 310 | TLOC[B1]/group-ID 0 |
| M2 | Border 304b | Control Device 310 | TLOC[B1']/group-ID 0 |
| M1 | Edge 302d | Control Device 312 | P2/TLOC[VE2] |
| M2 | Edge 302d | Control Device 312 | TLOC[VE2]/group-ID 2 |
| M2 | Border 304c | Control Device 310 | TLOC[B2]/group-ID 0 |
| M2 | Border 304d | Control Device 310 | TLOC[B2']//group ID 0 |

In one embodiment, the control device 310 may be configured to share information discovered/learned about the border network devices 304 with the control device 312. Additionally or alternatively, the control device 312 may be configured to share or reflect information received from one edge network device 302 to other edge network devices 302. For example, the control device 312 may reflect the TLOC, group-id, and/or prefix of the edge network device 302d to the edge network device 302a. Thus, for example, if the edge network device 302a needs to originate traffic to the prefix P2, the edge network device 302a may have stored (e.g., in a local routing table) that P2 is located at the transport locator TLOC[VE2] and is in the network domain associated with group-ID 2. The edge network device 302a may also have stored (e.g., in the local routing table) that the border network devices for its network domain (the internal network domain 306a associated with group-ID 1) are the border network devices 304a and 304b, and that the border network devices 3 for the network domain associated with group-ID 2 where the prefix is located include the border network devices 304c and 304d.

In one or more embodiments, each edge network device 302 originating traffic from a source prefix to a destination prefix may be configured to perform a path calculation procedure to select a path to the destination prefix. Such a path may include a best path, an available path, etc. to the destination prefix. Using the example illustrated in FIG. 3, the possible paths to P2 from the edge network device 302a are as follows:

Path 1: 302a→304a→304c→302d
Path 2: 302a→304a→304d→302d
Path 3: 302a→304b→304c→302d
Path 4: 302a→304b→304d→302d For each path, the originating edge network device 304 may be configured to determine the state (such as up or down) for each segment of the path. Thus, for the Path 1, the originating edge network device 302a may check the state of the following segments that make up Path 1:

302a→304a
304a→304c
304c→302d

If any of the segments of a path are down, then that entire path may be ruled out. In some embodiments, the originating edge network device 302 may be configured to select from the set of paths with all segments up, the best path or a path with performance above a threshold. The selected path may be determined based on performance metrics such as loss, latency, jitter, bandwidth, medium, etc. In one embodiment, the path with the best cumulative performance metric may selected. If multiple paths share the same performance metric, then in one embodiment of the present disclosure, the originating edge network device 302 may be configured to transmit packets to the destination prefix along the multiple paths to facilitate load sharing between the multiple paths.

In one embodiment each segment of a path may be assigned a data plane label. In one embodiment, to enable the path selection procedure described above, each edge network device 302 and/or border network device 304 may be configured to advertise segment information (e.g., the UP/DOWN state) of each segment connected to the network device, the performance metric of the segment, and/or the data plane label associated with the segment. Such information may be advertised by means of a message S that may be sent to a control device 310/312 associated with the advertising network device over the control plane. In some embodiments, the control devices 310/312 may periodically transmit the status and/or performance information regarding various path segments to the edge network devices 302. Additionally or alternatively, the edge network devices 302 may query the control device 312 to determine the status and/or performance of one or more path segments.

For example, using the example network 300, the border network device 304a may advertise the following segment information to the control device 310 over a control plane using a message S:

304a→304c up/down state
304a→304c performance metric
label required to send traffic to 304c, for ease of reference this label is notionally referred to as label "x"
304a→304d up/down state
304a→304d performance metric
label required to send traffic to 304d, for ease of reference this label is notionally referred herein as label "y".

As another example, using the example network 300, the border network device 304c may advertise the following segment information to the control device 310 over a control plane using a message S:

304c→304a up/down state
304c→304a performance metric
label required to send traffic to 304a, for ease of reference this label is notionally referred to as label "a"
304c→304b up/down state
304c→304b performance metric
label required to send traffic to 304b, for ease of reference this label is notionally referred to herein as label "b".

The control devices 310/312 may be configured to share the segment information with each other. The control device 312 may be configured to share the segment information with each edge network device 302 to which the control device 312 is connected.

After each edge network device 302 has the segment information, the edge network device 302 may be able to route traffic originated from a prefix in its own network domain to a prefix located in another network domain using the border network devices 304, without the border network devices having stored information regarding the prefixes.

For example, suppose the edge network device 302a is to send traffic from the prefix P1 to the prefix P2. Suppose further that the edge network device 302a selects the path 302a→304a→304c→302d to get to P2, based on the path selection techniques described above. For the above example, the edge network device 302a may send each packet to the border network device 304a with a label stack of "a" and "x". The border network device 304a may receive the packet is to be routed to the border network device 304c, the border network device 304a may remove the label and send the packet to the border network device 304c with label "x". When the border network device 304c receives the packet, the border network device 304c may analyze the label that the border network device 304c was to receive the packet. The border identifier such as a TLOC of the packet, and based on the identifier, route the packet to the edge network device 302d. Thus, traffic from the prefix P1 in the internal network domain 306a may be routed to the prefix P2 in the internal network domain 306b using the border network devices 304 without the border network devices storing information regarding the prefixes.

In accordance with some embodiments there may be a single control device configured to serve both the internal network domains 306 and the network domain 308. In other embodiments, each internal network domain 306 and each network domain 308 may have more than one control device assigned to it. In the case of multiple control devices, the control devices may be configured to pass information to each other learned through the control plane.

Modifications, additions, or omissions may be made to the system 300 without departing from the scope of the present disclosure. For example, the system 300 may include any number of edge network devices 302 organized into any number of network domains/groups 306 and/or any number of control devices 310/312. As another example, each network domain may include any number of border network devices 304.

Figure 4:
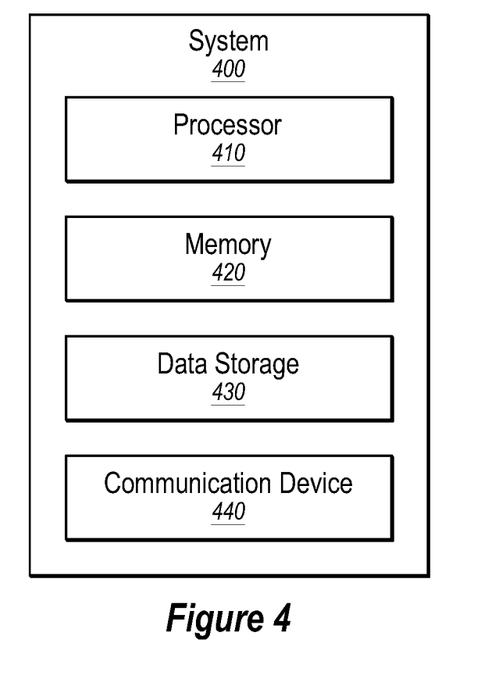
FIG. 4 illustrates an example computing system.

FIG. 4 illustrates an example computing system 400, according to at least one embodiment described in the present disclosure. The system 400 may include any suitable system, apparatus, or device configured to test software. The computing system 400 may include a processor 410, a memory 420, a data storage 430, and a communication unit 440, which all may be communicatively coupled. In some embodiments, any of the components of FIGS. 1-3 (e.g., the control device 108 of FIG. 1, the edge network devices 202, the border network devices 204 of FIG. 2, and/or the edge network devices 302, border network devices 304, and/or the control devices 310 and 312 of FIG. 3) or other computing devices of the present disclosure may be implemented as the computing system 400. Additionally or alternatively, one or more of the edge network devices, border network devices, control devices, local computing devices or other computing devices may be implemented as virtualized machines operating on a physical computing system such as the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

Figure 5A:
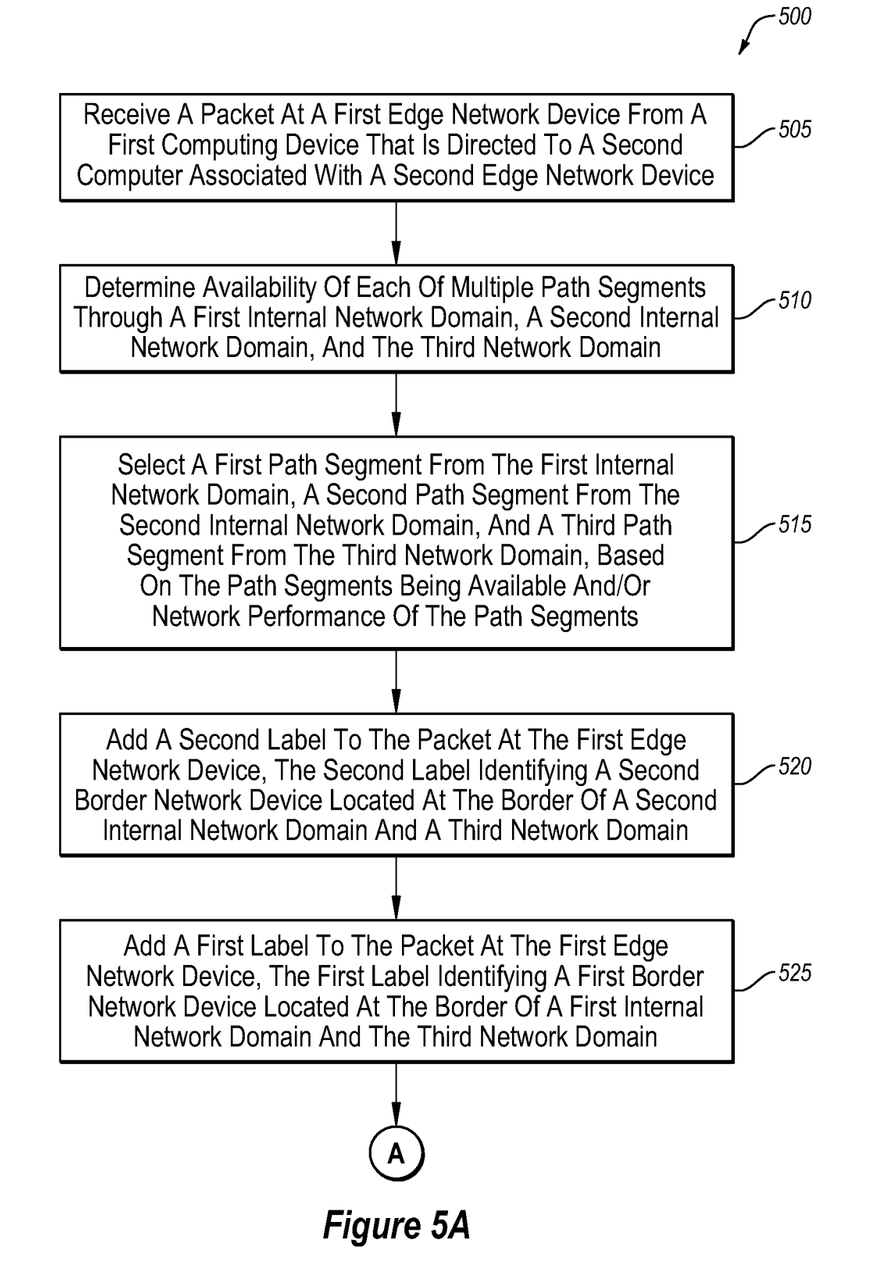
FIGS. 5A and 5B illustrates a flowchart of an example method of utilizing a hierarchical network overlay.

After the program instructions are loaded into the memory 420, the processor 410 may execute the program instructions, such as instructions to perform the methods 500 or 600 of FIGS. 5A/B and 6, respectively. For example, the processor 410 may facilitate the routing of a packet through multiple network domains based on one or more labels of the packet. As another example, the processor 410 may facilitate the provisioning of hierarchical network domains.

The memory 420 and the data storage 430 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network, such as an MPLS connection, the Internet, a cellular network (e.g., an LTE network), etc. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 440 may permit data to be exchanged with a network and/or any other devices or systems described in the present disclosure. For example, the communication unit 440 may allow the system 400 to communicate with other systems, such as network devices, control devices, and/or other networks.

Modifications, additions, or omissions may be made to the system 400 without departing from the scope of the present disclosure. For example, the data storage 430 may be multiple different storage mediums located in multiple locations and accessed by the processor 410 through a network.

As indicated above, the embodiments described in the present disclosure may include the use of a special purpose or general purpose computer (e.g., the processor 410 of FIG. 4) including various computer hardware or software modules, as discussed in greater detail below. Further, as indicated above, embodiments described in the present disclosure may be implemented using computer-readable media (e.g., the memory 420 or data storage 430 of FIG. 4) for carrying or having computer-executable instructions or data structures stored thereon.

Figure 5B:
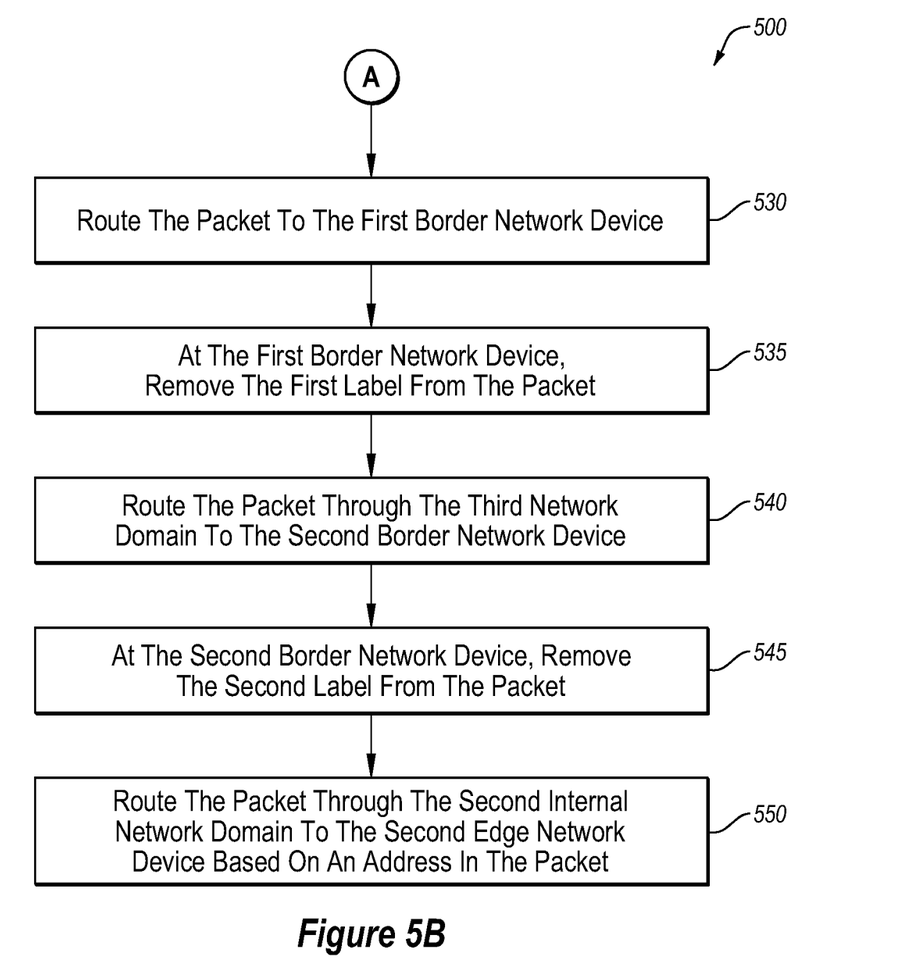

FIGS. 5A and 5B illustrate a flowchart of an example method 500 of utilizing a hierarchical network overlay, in accordance with one or more embodiments of the present disclosure. Although illustrated as discrete blocks, various blocks may be divided into additional blocks, combined into fewer blocks, or eliminated, depending on the particular implementation.

At block 505, a packet may be received at a first edge network device from a first computing device. The packet may be directed to a second computer associated with a second edge network device. The first edge network device may be located in a first internal network domain and the first computer computing device may be configured to access one or more other computing resources located within the first internal network domain via the first edge network device. The second edge network device may be located in a second internal network domain. The first and the second internal network domains may be part of a common software-defined network for an organization. For example, the first internal network domain may be associated with one or more edge network devices in a first geographical region (e.g., the United States) and may be referred to as a first group, and the second internal network domain may be associated with one or more edge network devices in a second geographical region (e.g., Singapore) and may be referred to as a second group. The first internal network domain and the second internal network domain may be under the control of a single entity.

At block 510, availability of each of multiple path segments may be determined. The multiple path segments may include path segments through the first internal network domain and the second internal network domain. The multiple path segments may additionally include path segments through a third network domain. The third network domain may include one or more border network devices located in each of the internal network domains and the third network domain. The third network domain may include one or more transportation modalities out of control of the single entity. For example, an Internet service provider (ISP), cellular carrier, or other communication provider may maintain or otherwise provide access to the third network domain. In these and other embodiments, one or more of the edge network devices and/or border network devices may monitor or otherwise maintain the status (e.g., up or down) and/or performance (e.g., jitter, latency, loss, bandwidth) of one or more communication channels available to the edge network devices and/or border network devices (e.g., an MPLS connection, the Internet, a cellular connection). In these and other embodiments, the status and/or performance may be transmitted to a control device. In some embodiments, the edge network devices may transmit the status and/or performance information to one control device and the border network devices may transmit the status and/or performance information to another control device. In other embodiments, the edge network devices and the border network devices may transmit the status and/or performance to the same control device. In some embodiments, one or more control devices may communicate status and/or performance information between each other. Additionally or alternatively, the one or more control devices may communicate the status and/or performance information to the edge network devices such that the edge network devices may determine availability and/or performance of the various path segments. In some embodiments, such communication may occur over a secure control link between the edge network devices and the one or more control devices.

At block 515, a first path segment from the first internal network domain, a second path segment from the second internal network domain, and a third path segment from the third network domain may be selected. Each of such selections may be based on availability and/or performance of the various path segments. Additionally or alternatively, such a selection may be performed based on a policy of a preferred path.

At block 520, a second label may be added to the packet at the first edge network device. The second label may identify a second border network device located at the border of the second internal network domain and the third network domain. For example, the second label may be added based on the first edge network device having stored information that the second computing device may be accessed via the second edge network device in the second internal network domain. The label may be utilized to indicate that the packet is to be routed through the second border network device.

At block 525, a first label may be added to the packet at the first edge network device. The first label may identify the first border network device located at the border of the first internal network domain and the third network domain. In some embodiments, the first label and the second label may act as a stack or encapsulation of the packet. For example, the first label may be read and/or analyzed first, and after the first label is removed, the second label may be read and/or analyzed. The label may be utilized to indicate that the packet is to be routed through the first border network device.

At block 530, the packet may be routed through the first internal network domain to the first border network device.

For example, based on the first label identifying the first border network device, the packet may be routed along the first path segment selected at block 515.

At block 535, the first border network device may remove the first label from the packet such that the second label is available to be analyzed and or utilized for routing traffic.

At block 540, the packet may be routed through the third network domain to the second border network device. For example, the first border network device may analyze the second label and, based on the second label, may route the packet through the third network domain along the third path segment selected at block 515. In some embodiments, the label may indicate a communication path or medium along which the packet is to be routed.

At block 545, the second label may be removed from the packet by the second border network device. For example, the second label may be removed such that the packet may be of the form when received at the first edge network device.

At block 550, the packet may be routed through the second internal network domain to the second edge network device based on an address in the packet. For example, the packet may include an address identifying the second edge network device and/or an identifier usable by the second edge network device to route the packet to the second computing device. In some embodiments, the address may include a TLOC.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
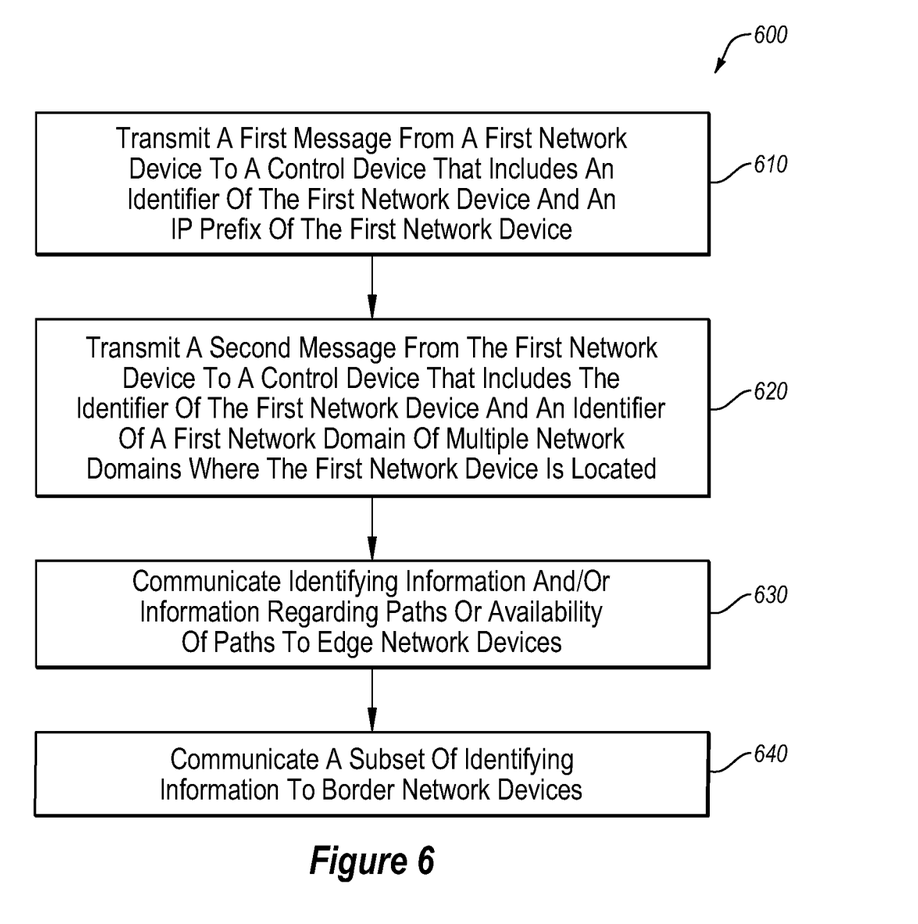
FIG. 6 illustrates a flowchart of an example method of provisioning a hierarchical network overlay.

FIG. 6 illustrates a flowchart of an example method 600 of provisioning a hierarchical network overlay, in accordance with one or more embodiments of the present disclosure. Although illustrated as discrete blocks, various blocks may be divided into additional blocks, combined into fewer blocks, or eliminated, depending on the particular implementation.

At block 610, a first message may be transmitted from a first network device to a control device. The first message may include an identifier of the first network device and an IP prefix of the first network device. For example, an edge network device may transmit such a first message that includes a TLOC of the edge network device and a prefix (such as an IPv4 or IPv6 prefix) associated with the network device.

At block 620, a second message may be transmitted from the first network device to the control device. The second message may include the identifier of the first network device and an identifier of a first network domain of multiple network domains where the first network device is located. For example, an edge network device may transmit the second message with the TLOC of the edge network device and a group identifier identifying to which internal network domain the edge network device belongs. As another example, a border network device may transmit the second message with the TLOC of the border network device and a group identifier identifying the network domain located between the internal network domains (for example, group 0 of FIG. 2 or group 0 of FIG. 3). In these and other embodiments, the second message may be sent before or after the first message. Additionally or alternatively, the second message may be sent without the first message.

At block 630, the control device may communicate information to one or more edge network devices. For example, the control device may communicate the received TLOC and/or group identifiers to one or more of the edge network devices. As another example, the control device may communicate information regarding the availability or status of paths or path segments. For example, the first edge network device may receive information regarding the availability of path segments through one or more of the network domains. As another example, the control device may communicate information regarding the performance (e.g., jitter, latency, loss, bandwidth, etc.) of one or more path segments.

At block 640, the control device may communicate a subset of the identifying information to the border network devices. For example, the border network devices may receive identifying information regarding the other border network devices. In some embodiments, the border network devices may or may not receive or store information regarding network domains (e.g., groups) to which the border network device does not border. In these and other embodiments, the border network devices may communicate packets between and among other border network devices based on labels or other identifying information in the packets without information regarding edge network devices in other network domains.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

The embodiments described herein may include the use of a special purpose or general-purpose computer including various computer hardware or software modules, as discussed in greater detail below.

As used in the present disclosure to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., the term among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, However, the use of such phrases should not be construed to imply that the claim containing such introduced claim recitation to embodiments containing only one such definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the embodiments and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    sharing segment information across a plurality of network devices to enable routing of a packet between a plurality of border network devices without referencing an address of the packet identifying an edge network device;

receiving the packet at a first one of the plurality of border network devices, the first one of the plurality of border network devices located at a border of a plurality of network domains;

removing, at the first one of the plurality of border network devices, a first label of a plurality of labels from the packet, the first label identifying the first one of the plurality of border network devices, the plurality of labels forming a label stack or an encapsulation of the packet;

receiving the packet at a second one of the plurality of border network devices located at another border of the plurality of network domains;

removing, at the second one of the plurality of border network devices, a second label of the plurality of labels from the packet, the second label identifying the second one of the plurality of border network devices; and routing the packet based on the address to the edge network device.

2. The method of claim 1, further comprising:
confirming the packet was to-be received by the first one of the plurality of border network devices; and
routing the packet to the second one of the plurality of border network devices based on the second label.

3. The method of claim 2, wherein routing of the packet to the second one of the plurality of border network devices is performed without storing the address of the packet identifying the second one of the plurality of border network devices and without referencing the address.

4. The method of claim 1, further comprising:
routing the packet based on an identifier in the packet, the identifier being a transport locator.

5. The method of claim 1, further comprising:
determining availability of each of a first plurality of path segments through a first one of the plurality of network domains;
determining availability of each of a second plurality of path segments through a second one of the plurality of network domains; and
determining availability of each of a third plurality of path segments through a third of the plurality of network domains.

6. The method of claim 5, further comprising:
selecting a first path segment from the first plurality of path segments based on the first path segment being available;
selecting a second path segment from the second plurality of path segments based on the second path segment being available; and
selecting a third path segment from the third plurality of path segments based on the third path segment being available.

7. The method of claim 6, wherein selecting the first path segment is further based on network performance of the first path segment.

8. The method of claim 1, further comprising:
transmitting a first message to a control device, the first message including an identifier and an Internet Protocol (IP) prefix.

9. The method of claim 8, further comprising:
transmitting a second message to the control device, the second message including the identifier.

10. A network device comprising:
one or more processors;
one or more communication devices; and
one or more non-transitory computer readable media containing instructions that, when executed by the one or more processors, performs operations comprising:
sharing segment information across a plurality of network devices to enable routing of a packet between a plurality of border network devices without referencing an address of the packet identifying an edge network device;
receiving the packet at a first one of the plurality of border network devices, the first one of the plurality of border network devices located at a border of a plurality of network domains;
removing, at the first one of the plurality of border network devices, a first label of a plurality of labels from the packet, the first label identifying the first one of the plurality of border network devices, the plurality of labels forming a label stack or an encapsulation of the packet;
receiving the packet at a second one of the plurality of border network devices located at another border of the plurality of network domains;
removing, at the second one of the plurality of border network devices, a second label of the plurality of labels from the packet, the second label identifying the second one of the plurality of border network devices; and
routing the packet based on the address to the edge network device.

11. The network device of claim 10, the operations further comprising:
determining availability of each of a first plurality of path segments through a first one of the plurality of network domains;
determining availability of each of a second plurality of path segments through a second one of the plurality of network domains; and
determining availability of each of a third plurality of path segments through a third one of the plurality of network domains.

12. The network device of claim 11, the operations further comprising:
selecting a first path segment from the first plurality of path segments based on the first path segment being available;
selecting a second path segment from the second plurality of path segments based on the second path segment being available; and
selecting a third path segment from the third plurality of path segments based on the third path segment being available.

13. The network device of claim 12, wherein selection of the first path segment is further based on network performance of the first path segment.

14. The network device of claim 11, wherein the one or more communication devices are configured to communicate over a Multi-Protocol Label Switching (MPLS) connection, an Internet connection, and a cellular connection.

15. The network device of claim 11, the operations further comprising:
generating a first message to be transmitted via the one or more communication devices to a control device, the first message including an identifier of the network device and an Internet Protocol (IP) prefix associated with the network device.

16. The network device of claim 15, the operations further comprising:

generating a second message to be transmitted via the one or more communication devices to the control device, the second message including the identifier of the network device.

17. A system comprising:

a first one of a plurality of border network devices, each of the plurality of border network devices located at a border between a plurality of network domains the first one of the plurality of border network devices configured to receive a packet and remove a first label of a plurality of labels from the packet, the first label identifying the first one of the plurality of border network devices, the plurality of labels forming a label stack or an encapsulation of the packet, the packet received by first one of the plurality of border network devices without referencing an address of the packet identifying an edge network device; and a second one of the plurality of border network devices, the second one of the plurality of border network devices configured to receive the packet without referencing the address of the packet and remove a second label of the plurality of labels from the packet to enable routing of the packet based on the address to the edge network device, the second label identifying the second one of the plurality of border network devices.

18. The system of claim 17, wherein the first one of the plurality of border network devices is configured to:

confirm the packet was to-be received by the first one of the plurality of border network devices; and route the packet to the second one of the plurality of border network devices based on the second label.

19. The system of claim 18, wherein the first one of the plurality of border network devices is further configured to route the packet without storing the address of the packet identifying the second one of the plurality of border network devices and without referencing the address.

20. The system of claim 17, wherein the second one of the plurality of border network devices is configured to route the packet based on an identifier in the packet, the identifier being a transport locator.

* * * * *